United States Patent

Van Giel et al.

[11] Patent Number: 5,581,990
[45] Date of Patent: Dec. 10, 1996

[54] TWISTING STEEL CORD WITH WAVY FILAMENT

[75] Inventors: Frans Van Giel, Gullegem; Xavier De Vos, Oudenaarde; Luc Sabbe, Deerlijk, all of Belgium

[73] Assignee: N.V. Bekaert S.A., Zwevegem, Belgium

[21] Appl. No.: 408,837

[22] Filed: Mar. 22, 1995

[30] Foreign Application Priority Data

Apr. 7, 1994 [EP] European Pat. Off. .............. 94200946

[51] Int. Cl.⁶ .............................. D01H 13/26; D02G 3/36
[52] U.S. Cl. ...................... 57/311; 57/9; 57/13; 57/58.3; 57/902
[58] Field of Search .......................... 57/9, 13, 311, 57/902, 58.3

[56] References Cited

U.S. PATENT DOCUMENTS 3,413,792  12/1968  Werdenberg ...................... 57/9
5,020,312  6/1991  Watakabe ...................... 57/200
5,319,915  6/1994  Kobayashi et al. .................. 57/200

FOREIGN PATENT DOCUMENTS

| 0551124 | 7/1993 | European Pat. Off. . | |
| 619398 | 10/1994 | European Pat. Off. .................. | 57/902 |
| 1390922 | 4/1963 | France . | |
| 5-302282 | 11/1993 | Japan ........................................ | 57/902 |
| 6-108387 | 4/1994 | Japan ........................................ | 57/902 |

Primary Examiner—William Stryjewski
Attorney, Agent, or Firm—Foley & Lardner

[57] ABSTRACT

A steel cord comprises steel filaments twisted around each other in a first direction about at least one steel core filament having a wave form. The twisted filaments are individually subjected to a rotation about their own axes. This steel cord is formed by deforming the core filament into a planar wave form and twisting the core filament in a second direction to a predetermined degree. The core filaments together with the other filaments are twisted in the first direction so that the twisted filaments are individually subjected to a rotation around their own axes in the first direction.

12 Claims, 2 Drawing Sheets

TWISTING STEEL CORD WITH WAVY FILAMENT

FIELD OF THE INVENTION

The invention relates to a method of manufacturing and to an apparatus for manufacturing a steel cord comprising steel elements which have been twisted around each other in a first direction. At least one of the steel elements has a wave form.

The invention also relates to a steel cord comprising steel elements which have been twisted around each other in a first direction. At least one of the steel elements has a wave form.

BACKGROUND OF THE INVENTION

Prior art document EP-A-0 551 124 discloses a steel cord constituted by a core filament and a plurality of layer filaments around the core filament. The core filament may have a spatial wave form or a planar wave form.

The embodiment with the core filament in a planar wave form is particularly advantageous when used as reinforcement in the breaker or belt layer of a rubber tire. One reason is that if the plane of the wave form is parallel to the rubber ply of the tire, the thickness of the rubber ply does not increase in spite of the fact of the wavy form of the core filament and in spite of the resulting increase in cord diameter. Another reason is that a plane wave form provides an improved rubber penetration compared to a spatial wave form.

SUMMARY OF THE INVENTION

It is an object of the present invention to provide for an economic way of manufacturing a steel cord comprising at least one steel element with a wave form.

It is also an object of the present invention to provide for a steel cord comprising at least one steel element with a planar wave form which has been manufactured in an economic way.

According to a first aspect of the present invention, there is provided for a method of manufacturing such a steel cord which comprises steel elements which have been twisted around each other in a first direction and wherein at least one of the steel elements has a wave form.

The method comprises as steps:

(i) deforming at least one steel element into a planar wave form;

(ii) twisting the at least one steel element in a second direction and to a predetermined degree;

(iii) twisting the at least one steel element together with other steel elements in the first direction into the final steel cord, so that the twisted steel elements are individually subjected to a rotation around their own axes in said first direction.

The terms "steel element" refer to both a steel filament and a strand constituted of more than one steel filament.

The "predetermined degree" of twisting is fixed by the required final twisting step or twisting pitch of the steel cord: as is well known in the art, the twisting pitch is inversely proportional to the number of twists. For a twisting pitch of 10 mm the cord has received 100 twists per meter, for a twisting pitch of 20 mm the cord has received 50 twists per meter.

Preferably the first direction is opposite to the second direction.

The twisted steel elements are individually subjected to a rotation around their own axes. This means that the twisting is done by means of a so-called single-twister or, preferably, by means of a so-called double-twister. The output of such a twister, especially of a double-twister, can be much higher than the output of a tubular stranding machine.

The twisting into the final steel cord can either be done at substantially the same predetermined degree in a first direction opposite to the second direction in order to obtain a planar wave form in the at least one steel element of the final cord (first form) or can be done at a degree which is substantially different from the predetermined degree in order to obtain a spatial wave form in the at least one steel element of the final cord (second form).

In the embodiment with the final planar wave form (first form), the planar wave form is prevented from rotating around its own axes in the final cord, by subjecting them to a preliminary rotation in an opposite direction in step (ii). In this way the planar wave form remains planar in the final cord, notwithstanding the fact that a single-twister or a double-twister has been used.

When using a double twister, the method according to the first aspect of the present invention preferably comprises a step of drawing for the individual steel elements their length which is needed in the final cord. This drawing of the correct length should be done before the final twisting of step (iii). As will be explained hereunder, the advantage of this additional step is that radial core migration is avoided.

In a preferable and very economic way of carrying out the invention method, the preliminary twisting of the one or more steel elements with the planar wave form—step (ii)—is carried out by means of deformation means rotating at a rotation speed which is tuned in the rotation speed of the double-twister, which means that step (i) is carried out simultaneously with step (ii).

According to a second aspect of the present invention, there is provided for an apparatus for manufacturing a steel cord which comprises steel elements which have been twisted around each other in a first direction and wherein at least one of the steel elements has a wave form. The apparatus comprises:

formation means for deforming one or more steel elements into a planar wave form;

rotation means for twisting the steel elements with the planar wave form in a second direction;

a twister for twisting the steel elements with the planar wave form together with other steel elements in the first direction to obtain the final steel cord.

The twister can be a single-twister but is preferably a double-twister.

The apparatus preferably further comprises means for drawing the length of the steel elements which is needed in the final steel cord.

For reasons of economy, the rotation means preferably comprise a false twister.

According to a third aspect of the present invention, there is provided for a steel cord which comprises steel elements which have been twisted around each other in a first direction and wherein at least one of the steel elements has a planar wave form. At least some of the steel elements which do not have a planar wave form have a surface with drawing lines which form a helicoid in the first direction, i.e. the direction of twisting, which means that these steel elements have been subjected to a rotation around their own axes and that the steel cord has been manufactured by means of a single-twister or a double-twister.

Preferably, the steel elements with the wave form constitute the core of the steel cord and the steel elements with the planar wave form have also a surface with drawing lines which form a helicoid in the first direction.

BRIEF DESCRIPTION OF THE DRAWINGS

The invention will now be explained into more detail with reference to the accompanying drawings wherein.

DESCRIPTION OF EMBODIMENTS OF THE INVENTION

Prior art

Figure 1:
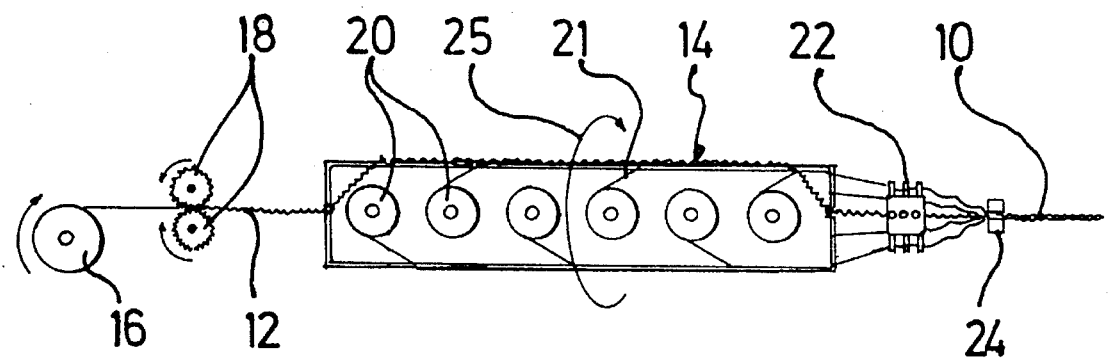
FIG. 1 shows a tubular stranding machine according to the prior art.

FIG. 1 illustrates a conventional way of manufacturing a 1+6 steel cord 10 having one single core filament and six layer filaments. The core filament 12 has a planar wave. The manufacturing is carried out by means of a well known tubular stranding machine 14. The core filament 12 is unwound from a supply spool 16 and is passed between the teeth of two stationary toothed wheels 18 which function as a deformation device that gives the core filament 12 a planar wave form. The toothed wheels 18 are not driven by an external motor. They are driven by the core filament 12 which is pulled from between the teeth. The thus deformed core filament 12 is passed to the tubular stranding machine 14 where the core filament is guided on the cylindrical surface (guiding elements not shown). The cylindrical main body of the tubular stranding machine comprises six stationary supply spools 20 where the layer filaments 21 are unwound. These layer filaments 21 are also guided via the cylindrical surface of the stranding machine 14. At the downstream end of the stranding machine 14 the layer filaments 21 are plastically deformed by a preforming device 22 and are laid around the core filament 12 at the cord forming die 24 in order to form the 1+6 steel cord 10.

As is known in the art, a tubular stranding machine 14 does not subject the individual steel filaments 12, 21 to a rotation around their own axes so that the planar wave form of the core filament 12 remains in one plane after the steel cord 10 has been made, which can be an advantage. A drawback of a tubular stranding machine 14 is that only one twist is given to the steel cord 10 per revolution 25 of the stranding machine 14. So the output is limited. Another drawback of a tubular stranding machine 14 is that the size of the supply spools 20 is limited.

First embodiment according to the invention

Figure 2:
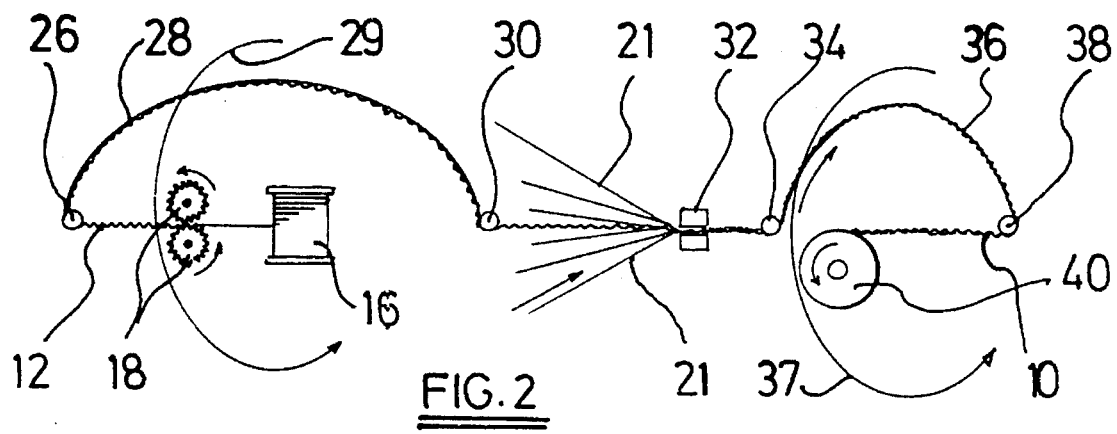
FIG. 2 shows schematically a first embodiment of an invention apparatus.

FIG. 2 schematically illustrates a first embodiment according to the invention. The core filament 12 is drawn from supply spool 16 and is passed through the teeth of two stationary toothed wheels 18 in order to obtain a planar wave form. The thus deformed core filament 12 is guided via reversing pulley 26 over flyer 28 which rotates in the sense of arrow 29, to a guiding pulley 30. The supply spool 16 and the toothed wheels 18 are stationarily mounted inside flyer 28.

Further on, the core filament 12 is brought together with the six layer filaments 21 at an assembly point 32 upstream of a double-twister. The assembled filaments 12, 21 are guided via a guiding pulley 34 over a flyer 36 which rotates in the sense of arrow 37, to a reversing pulley 38. At the reversing pulley 38 the steel cord 10 changes from direction and is led to a stationary spool 40 where the steel cord 10 is wound.

The principal working of the invention is as follows. The flyers 28 and 36 rotate in the same sense 29, 37 and at substantially the same rotational speed n. The core filament 12 with the planar wave receives two twists in the S-direction per revolution of flyer 28 in the sense 29. Downstream, however, the core filament receives two twists in the Z-direction per revolution of flyer 36. Since the rotational speeds of flyers 28 and 36 are substantially the same, the twists in the S-direction are compensated by the twists in the Z-direction so that wavy core filament 12 returns back to its planar form during its being twisted in the final cord 10.

In this embodiment, the core filament in the final cord has not been subjected to a rotation around its central axis and, as a consequence, does not have drawing lines which form helicoid on its surface.

As it has already been mentioned and as it is well known in the art, two twists are given to the cord per revolution of flyer 36 of the double-twister, which means that a double-twister may have an output which is twice the output of a tubular stranding machine.

Second embodiment according to the invention

Figure 3:
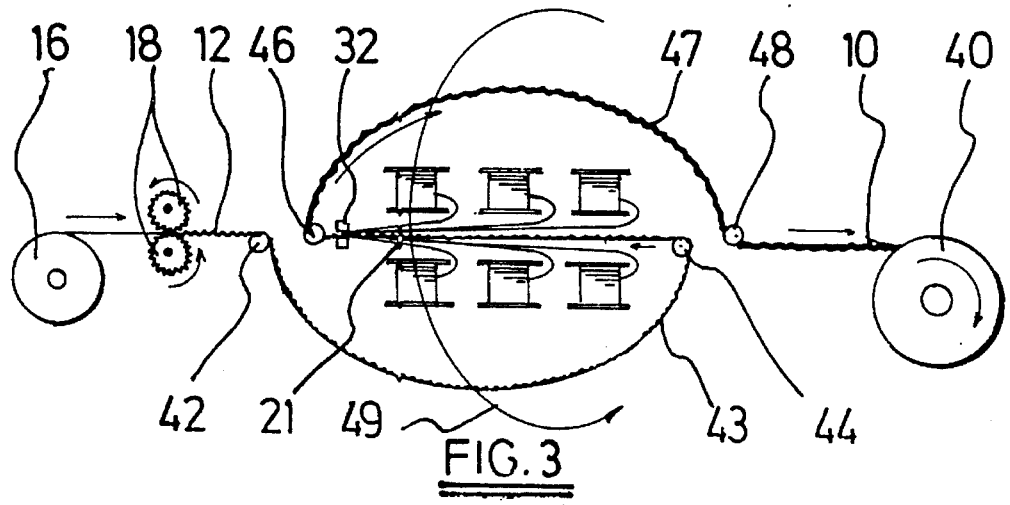
FIG. 3 shows schematically a second embodiment of an invention apparatus.

FIG. 3 schematically illustrates a second invention method and apparatus. Core filament 12 is again drawn from a stationary supply spool 16 and is passed between the teeth of two toothed wheels 18 before being guided to a double-twister. The toothed wheels are stationarily mounted and are again not driven by an external motor. The deformed steel filament 12 is guided via a first guiding wheel 42, over a flyer 43 and over a first reversing pulley 44 inside the flyer 43 where it reaches an assembly point 32. Six spools 20 are mounted stationarily inside the flyer 43 and supply the layer filaments 21 which come together with the core filament 12 at assembly point 32. The assembled steel filaments 12, 21 are then guided via a second reversing pulley 46 over a flyer 47 and over a guiding pulley 48 to a spool 40 which is mounted outside the flyers 43 and 47. It is hereby understood that flyers 43 and 47 are mounted on the same half-axles of the double-twister and that they rotate at the same rotational speed in the sense of arrow 49.

The principal working can be explained as follows. For each rotation of flyer 43 two twists are given to the core filament 12 in the Z-direction, but these twists are compensated by the action of flyer 47 which gives two twists in the S-direction for each rotation.

Third and preferred embodiment according to the invention

Figure 4:
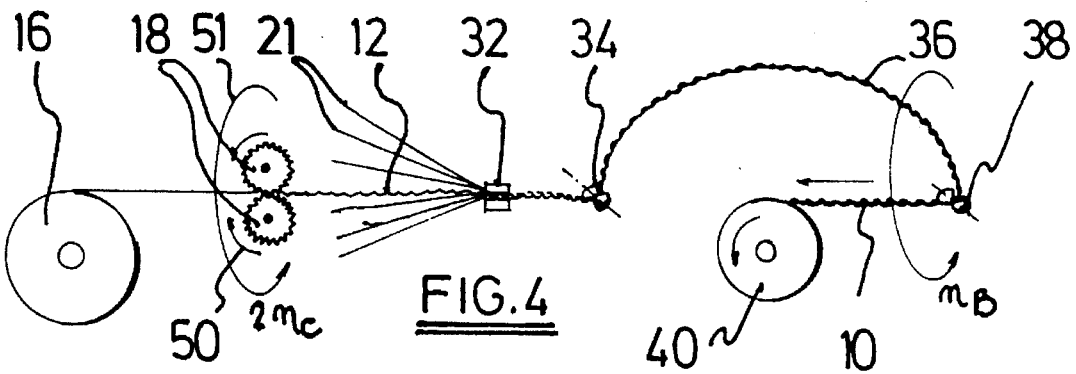
FIG. 4 shows schematically a third and preferable embodiment of an invention apparatus.

Referring to FIG. 4, core filament 12 is again drawn from a supply spool 16 and is passed between the teeth of two toothed wheels 18 which give the core filament 12 a wavy form. Here again the toothed wheels 18 are not driven in the sense of arrows 50 by an external motor but are driven by the core filament 12 itself. Hence the pulling force on the core filament 12 functions as the driving source for the toothed wheels in the sense of arrows 50.

In contradistinction, however, with the first and second invention embodiments, the toothed wheels 18 are not stationarily mounted but rotate as a whole in the sense of arrow 51 at a rotational speed $n_C$. The deformed core filament 12 is led to an assembly point 32 where it is brought together with the six layer filaments 21. The assembled filaments 12, 21 are guided via a guiding pulley 34 over a flyer 36 and over a reversing pulley 38 to a stationary spool 40 which is mounted inside the flyer 36. False twist means (not shown) to remove residual torsions and a straightener (not shown) to improve the straightness and to reduce the arc height may be provided between reversing pulley 38 and stationary spool 40.

Figure 5:
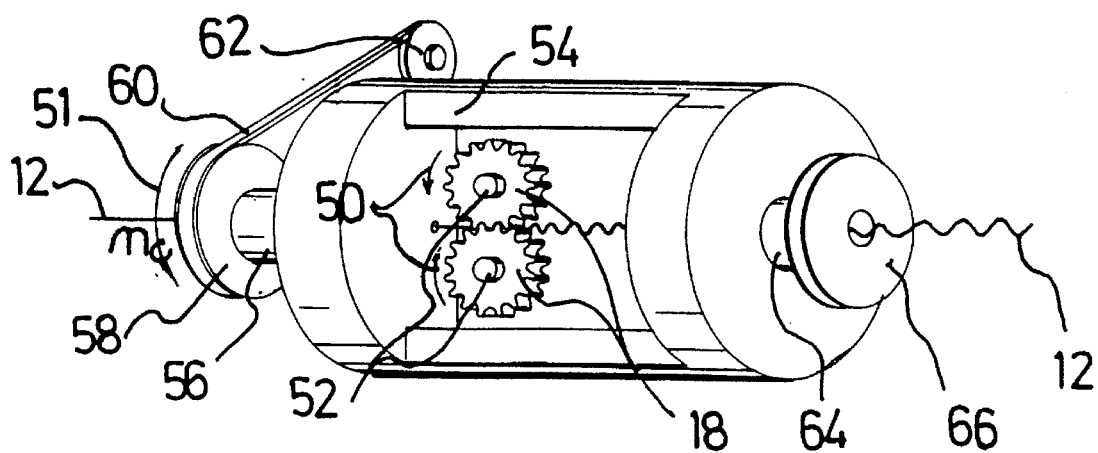
FIG. 5 shows a detailed perspective view of deformation and rotation means of the preferable embodiment of the invention apparatus.

FIG. 5 shows into more detail the mounting of the deformation device. The two toothed wheels 18 are mounted via their axles 52 and by means of suitable bearings (not shown) in a housing 54. Housing 54 is fixedly connected to a hollow axle 56 which is in its turn fixedly connected to a hollow disc 58. The whole housing is externally driven in the direction of arrow 51 by means of a belt 60 and a pulley 62. Core filament 12 enters via the hollow disc 58 and hollow axle 56 and receives a wavy form between the teeth of toothed wheels 18. The wavy core filament 12 leaves the deformation device via hollow axle 64 and hollow disc 66.

With respect to twists given to the core filament 12, the deformation device functions as a false twister. Upstream the toothed wheels 18 the (undeformed) core filament 12 is twisted in the Z-direction. Downstream the toothed wheels 18 the deformed core filament is twisted in the S-direction.

With respect to the deformations, these are thus only twisted in the S-direction and a core filament 12 with a spatial wave form leaves the deformation device.

With respect to the core filament 12 taken as a whole, the twists in the Z-direction are compensated by the twists in the S-direction so that the core filament 12 leaves the deformation device without any rotations around its own axis.

Referring back to FIG. 4, flyer 36 of the double-twister has a rotational speed $n_B$. The rotational speed $n_C$ of the deformation device can be tuned on the rotational speed $n_B$. If, in a first form, $n_C$ equals $2 n_B$, the twists in the S-direction given to the initially planar wave form of the core filament are compensated by the flyer 36 which gives a substantially equal amount of twists in the Z-direction, which means that the core filament 12 gets its planar wave form back in the final steel cord 10.

If, in a second form, $n_C$ is different from $2 n_B$, the twists in the S-direction given to the initially planar wave form are only partially compensated by the flyer 36, which means that the core filament 12 eventually gets a spatial wave form in the final steel cord 10.

More generally, the relationship between the lay length $LL_{core}$ of the deformed core filament 12, the lay length $LL_{cord}$ or twist pitch of the layer filaments 21, the rotational speed $n_C$ of the deformation device and the rotational speed $n_B$ of the double-twister can be summarized by following formula:

$$LL_{core} = \frac{2 \times LL_{cord}}{2 - \frac{n_C}{n_B}}$$

For the first form, where $n_C = 2 n_B$, the above formula results in an infinite value, which means a non-rotating or planar wave form.

It is hereby understood that the terms "lay length of the core" refer to the distance needed for one revolution of a core filament and do not refer to the wave length of the core wave form.

Also referring to FIG. 4, if no special measures are taken, the double-twister gives the twists to the steel cord 10 in two distinct and separate steps. A first twist is given upstream of guiding pulley 34 and a second twist is given downstream of reversing pulley 38. The layer filaments 21 are only wound from their supply spools to the extent dictated by the first twist. When the second twist is given to the steel cord 10 an unsufficient amount of length is available due to the fact that the layer filaments 21 are positioned at a distance from the axial center line of the steel cord. The unsufficiency in length gives rise to increased tensile tensions in the layer filaments 21. This increase in tensile tensions in the layer filaments 21 creates an increase of compression tensions in the core filament 12. The core filament, however, has been deformed. The increased compression tensions risk to create kinks in the core filament which may cause the core filament 12 to protrude between the layer filaments. This situation is called radial core migration and is to be avoided.

Radial core migration can be avoided by providing the double-twister with means which draw for each filament immediately the length which is needed in the final cord.

These means can be constituted by everything that help the twists given at the level of reversing pulley 38 to travel downstream to assembly point 32. Such means are known as such in the art.

Examples of such means are given in FR-A-1 390 922 where the flyer of a double-twister comprises a plurality of small guiding pulleys which allow the passing cord to rotate around its own cord axis. Still another example, as illustrated in FIG. 4, is constituted by an obliquely arranged guiding pulley 34 and an obliquely arranged reversing pulley 38, both provided with a U-groove. The oblique arrangement allows the cord 10 to rotate around its own axis, which helps the given twists to travel downstream.

Instead of forcing the twists to travel downstream along the flyer 36, another solution may be formed by placing upstream guiding pulley 34 a false twister which rotates at a rotation speed $2 n_B$ which is twice the rotational speed $n_B$ of the flyer 36. This results in a twist given at the level of this false twister which is equal to the twist given in the final cord 10, which means that for each of the filaments the length needed in the final cord is drawn from the supply spools.

Figure 6:
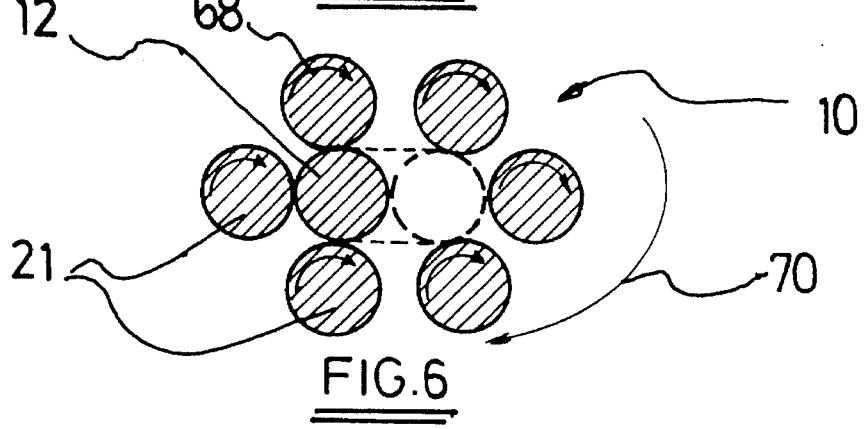
FIG. 6 shows a transversal cross-section of an invention cord.
Figure 7:
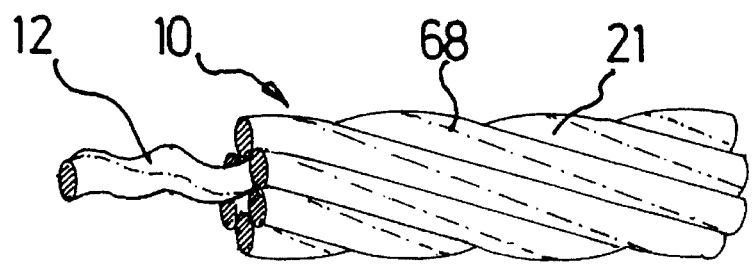
FIG. 7 shows a longitudinal view of an invention cord.

FIG. 6 and FIG. 7 respectively show a cross-sectional view and a longitudinal view of an invention 1+6 steel cord 10. The steel cord 10 comprises a core filament 12 which has a planar wave form and six layer filaments 21 surrounding the core filament.

Although the diameter of the core filament 12 is equal to the diameter of the layer filaments 21, gaps are present between the layer filaments 21 so that rubber can penetrate. This is due to the wavy form of the core filament 12.

The difference between an invention cord 10 and a prior art cord as manufactured by means of a tubular stranding machine 14 of FIG. 1, is that in an invention cord at least the layer filaments 21 have been subjected to a rotation around their individual axes and this in a sense 68 which is equal to the sense 70 of twisting of the final steel cord 10. This rotation around the individual filament axes can be detected by visual inspection of the drawing lines on the surface of the filaments. The drawing lines result from the unavoidable imperfections during the drawing of the filaments to their final diameter. In case of a tubular stranding machine 14 these drawing lines run parallel to the axes of the steel filaments. In case of a single-twister or of a double-twister these drawing lines take a helicoidal form on the surface of the steel filaments.

The present invention is not restricted to a 1+6 steel cord but can be applied to all kinds of cords having one or more steel elements with a wave form.

Some examples are here given in a non-limitative way:

1+4 and 1+5, where the single core filament has e.g. a planar wave form;

2+5, 2+6, 2+7, where the two core filaments are twisted or not but have e.g. a planar wave form;

3+6, 3+8 and 3+9, where the three core filaments may be twisted or not and have e.g. a planar wave form;

1+6+12 and 1+4+11 where the single core filament has e.g. a planar wave form . . .

The diameter of the filaments may range between 0.05 mm and 1.25 mm, and more particularly between 0.10 mm and 0.45 mm if the steel cord is to reinforce rubber tires. Common filament diameters for tire cord are: 0.15 mm, 0.175 mm, 0.20 mm, 0.22 mm, 0.25 mm, 0.27 mm, 0.28 mm, 0.35 mm and 0.38 mm.

The present invention is not restricted to a specific wave form. The wave form given to the steel elements depends upon the deformation device and may take a sinusoidal form or the form of a broken line with rather sharp angles. Both the wave amplitude and the wave length of the wave may vary over a wide range. For reasons of cord stability and rubber penetration, however, the wave length is preferably smaller than the twisting pitch of the steel cord.

We claim:

1. A method of manufacturing a steel cord comprising steel elements which have been twisted around each other in a first direction, at least one of the steel elements having a wave form, said method comprising as steps:

(i) deforming said at least one steel element into a planar wave form;

(ii) twisting said at least one steel element in a second direction and to a predetermined degree;

(iii) twisting said at least one steel element together with other steel elements in said first direction into the final steel cord, so that the twisted steel elements are individually subjected to a rotation around their own axes in said first direction.

2. A method according to claim 1, wherein said first direction is opposite to said second direction.

3. A method according to claim 2, wherein the twisting into the final steel cord is done to substantially the same predetermined degree in order to obtain a planar wave form in said at least one steel element.

4. A method according to claim 1, wherein the twisting into the final steel cord is done to a degree substantially different from said degree in order to obtain a spatial wave form in said at least one steel element.

5. A method according to claim 1, wherein the twisting into the final steel cord—step (iii)—is carried out by means of a double-twister working at a rotation speed.

6. A method according to claim 5, said method comprising a step of drawing for the individual steel elements a length which is needed in the final steel cord.

7. A method according to claim 1, wherein the twisting of said at least one steel element in a second direction—step (ii)—is carried out simultaneously with the deforming of said at least one steel element into a planar wave form—step (i).

8. An apparatus for manufacturing a steel cord comprising steel elements which have been twisted around each other in a first direction, at least one of the steel elements having a wave form, said apparatus comprising:

formation means for deforming said at least one steel element into a planar wave form;

rotation means for twisting said at least one steel element in a second direction;

a twister for twisting said at least one steel element together with other steel elements in said first direction to obtain the final steel cord.

9. An apparatus according to claim 8 wherein said twister is a double-twister.

10. An apparatus according to claim 9 wherein said apparatus further comprises means for drawing for the individual steel elements a length which is needed in the final steel cord.

11. An apparatus according to claim 10 wherein the rotation means comprises a false twister.

12. An apparatus according to claim 11 wherein the rotation means comprises the formation means.

\* \* \* \* \*